US010154251B2

(12) United States Patent
Wingrove et al.

(10) Patent No.: US 10,154,251 B2
(45) Date of Patent: Dec. 11, 2018

(54) DISPLAY ASSEMBLY

(71) Applicants: Theodore Charles Wingrove, Plymouth, MI (US); Michael Eichbrecht, Farmington Hills, MI (US); Kyle Entsminger, Canton, MI (US); Andrew DeScisciolo, Canton, MI (US); James Joseph Kornacki, Dearborn, MI (US)

(72) Inventors: Theodore Charles Wingrove, Plymouth, MI (US); Michael Eichbrecht, Farmington Hills, MI (US); Kyle Entsminger, Canton, MI (US); Andrew DeScisciolo, Canton, MI (US); James Joseph Kornacki, Dearborn, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 273 days.

(21) Appl. No.: 14/976,547

(22) Filed: Dec. 21, 2015

(65) Prior Publication Data

US 2017/0180711 A1    Jun. 22, 2017

(51) Int. Cl.
| | | |
|---|---|---|
| H04N 13/00 | (2018.01) | |
| H04N 13/305 | (2018.01) | |
| G02B 3/00 | (2006.01) | |
| G02B 27/22 | (2018.01) | |
| H04N 13/395 | (2018.01) | |

(52) U.S. Cl.
CPC ......... *H04N 13/305* (2018.05); *G02B 3/0043* (2013.01); *G02B 3/0075* (2013.01); *G02B 27/2214* (2013.01); *H04N 13/395* (2018.05); *H04N 2213/001* (2013.01)

(58) Field of Classification Search
CPC ............... G02B 27/2242; G02B 27/22; G02B 27/2214; H04N 13/0404; H04N 13/044; H04N 13/0409; H04N 13/04
See application file for complete search history.

(56) References Cited

U.S. PATENT DOCUMENTS

| | | | |
|---|---|---|---|
| 1,726,314 A | 8/1929 | Rose | |
| 5,949,526 A * | 9/1999 | Koguchi | ............ H04N 1/40031 355/41 |
| 7,359,120 B1 * | 4/2008 | Raymond | .......... G02B 27/2214 359/619 |

(Continued)

*Primary Examiner* — Frank F Huang
(74) *Attorney, Agent, or Firm* — Quinn IP Law

(57) ABSTRACT

A display assembly for showing perceived depth is provided. The display includes a display panel for displaying images and video. A lens extends parallel to and in a spaced relationship with the display panel to define a distal viewing area. An optically clear adhesive is partially disposed between the display panel and the lens to define a plurality of proximal viewing areas. The lens has a varying lens thickness for altering the presentation of the images and video displayed on the display panel in the proximal viewing areas relative to the presentation of the images and video displayed on the display panel in the distal viewing area to create a three dimensional appearance of the images and video. A controller is configured to tailor the images and video presented in the distal viewing area relative to the images and video in the proximal viewing areas to enhance the three dimensional appearance.

11 Claims, 7 Drawing Sheets

(56) References Cited

U.S. PATENT DOCUMENTS

| | | | |
|---|---|---|---|
| 7,369,044 B2 | 5/2008 | Ono et al. | |
| 8,866,882 B2 | 10/2014 | Liu et al. | |
| 8,920,592 B2 | 12/2014 | Suwa et al. | |
| 8,941,691 B2 | 1/2015 | Baron | |
| 9,116,357 B2* | 8/2015 | Chen | G02B 27/2214 |
| 2005/0068590 A1* | 3/2005 | Shiota | B41J 2/45 |
| | | | 358/474 |
| 2010/0188584 A1* | 7/2010 | Liu | G06T 7/50 |
| | | | 348/699 |
| 2011/0149125 A1* | 6/2011 | Morimoto | H04N 5/225 |
| | | | 348/272 |
| 2012/0050562 A1* | 3/2012 | Perwass | H04N 5/2254 |
| | | | 348/222.1 |
| 2012/0257407 A1* | 10/2012 | Demma | B60R 13/04 |
| | | | 362/602 |
| 2013/0113785 A1* | 5/2013 | Sumi | H04N 13/0409 |
| | | | 345/419 |
| 2014/0055575 A1* | 2/2014 | Imamura | H04N 9/07 |
| | | | 348/49 |
| 2016/0252739 A1* | 9/2016 | Wei | G02B 27/2214 |
| | | | 359/463 |

* cited by examiner

DISPLAY ASSEMBLY

BACKGROUND

Display assemblies are used to present images and video. Display assemblies can include a display panel and may also include a lens extending parallel to the display panel. An adhesive is sometimes used to secure the lens to the display panel. Specific applications of display assemblies may include instrument clusters or infotainment systems in vehicles, for example. Such display assemblies can provide the driver and/or passengers of a vehicle with useful information for operating the vehicle and/or for entertainment.

As display assemblies become more advanced, consumers tend to prefer display assemblies capable of effects that show perceived physical depth. The perceived physical depth may provide a more immersive three dimensional experience. Also, in the case of instrument clusters particularly, physical gauges may be used in conjunction with the display panel. However, it can be difficult to effectively combine the physical gauges with the display panel in a way that makes the result look visually seamless across multiple planes in a three dimensional space. The difficulty can arise due to the perceived viewing distance of physical gauges to the viewer as compared to the perceived viewing distance to the display panel (i.e., the physical gauge does not appear to be embedded in the display panel).

In order to create the perception of physical depth, display assemblies conventionally utilize two or more display panels. As a result, such display assemblies are usually more expensive to produce and only convincingly create the appearance of depth when images and video displayed on each display panel is processed or tailored to help create the illusion of depth. In other words, the images and video on the first display must be augmented with images and video on the second display that give the viewer the overall impression that the combined images and videos are three dimensional.

Display assemblies can alternatively present images and video separately to each eye stereoscopically in order to create a three dimensional effect. Such stereoscopic display assemblies, however, may require electronic shuttering and/or the use of special glasses to be worn by the viewer to ensure that the viewer's eyes properly receive the stereoscopic images and video.

SUMMARY

This section provides a general summary of the disclosure and is not a comprehensive disclosure of its full scope or all of its features, aspects or objectives.

A display assembly is provided. The display assembly includes a lens surface configured to display digital data. On a surface of the lens surface, there is an optically clear adhesive layer. The optically clear adhesive layer is selectively applied. The digital data is re-rendered based on the selective application of the optically clear adhesive layer.

An additional display assembly for showing perceived depth is provided. The display includes a display panel for displaying images and video. A lens extends parallel to and in a spaced relationship with the display panel to define a distal viewing area. An optically clear adhesive is partially disposed between the display panel and the lens to define a plurality of proximal viewing areas. The lens has a varying lens thickness for altering the presentation of the images and video displayed on the display panel in the proximal viewing areas relative to the presentation of the images and video displayed on the display panel in the distal viewing area to create a three dimensional appearance of the images and video.

Similarly, another display assembly for showing perceived depth is also provided. The display includes a display panel for displaying images and video. A lens extends parallel to and in a spaced relationship with the display panel to define a distal viewing area. An optically clear adhesive is partially disposed between the display panel and the lens to define a plurality of proximal viewing areas. The optically clear adhesive has a varying adhesive thickness for altering the presentation of the images and video displayed on the display panel in the proximal viewing areas relative to the presentation of the images and video displayed on the display panel in the distal viewing area to create a three dimensional appearance of the images and video.

An additional display assembly for showing perceived depth is also provided. The display includes a display panel for displaying images and video. A lens extends parallel to and in a spaced relationship with the display panel to define a one distal viewing area. A physical object is disposed between the display and the lens in the distal viewing area. An optically clear adhesive is partially disposed between the display panel and the lens to define a plurality of proximal viewing areas for altering the presentation of the images and video displayed on the display panel in the proximal viewing areas relative to the physical object and the images and video displayed on the display panel in the distal viewing area to create a three dimensional appearance of the images and video and the physical object.

Thus, the display assembly according to the disclosure provides various advantages. Specifically, the perception of depth can be created by the display assembly in a way that provides a visually seamless appearance across multiple planes in three dimensional space. Additionally, the display assembly disclosed herein can make it appear to a viewer as if any physical objects (e.g., gauges in an instrument cluster) disposed between the display panel and lens are embedded in the viewable display.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all implementations, and are not intended to limit the present disclosure to only that actually shown. With this in mind, various features and advantages of example embodiments of the present disclosure will become apparent from the written description when considered in combination with the appended Figures, wherein.

DETAILED DESCRIPTION

Figure 1:
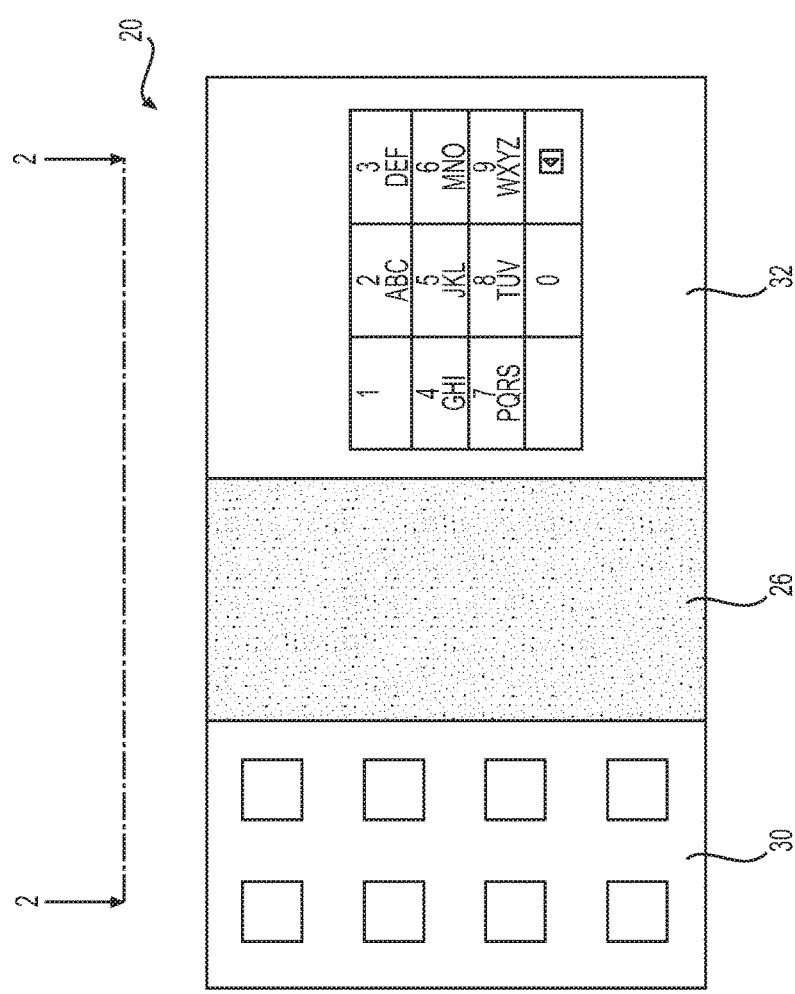
FIG. 1 illustrates an example of a display assembly for showing perceived depth.

In the interest of creating the perception of physical depth, display assemblies conventionally utilize more than one display panel, for example, one on top of the other. Consequently, such display assemblies only convincingly produce the appearance of depth when images and video displayed on each display panel is processed or tailored to help create the illusion of depth. Particularly, the images and video on the first display must be augmented with images and video on the second display that give the viewer the overall impression that the combined images and videos are three dimensional. However, display assemblies utilizing more than one display panel can also be more expensive to manufacture.

Instead of using multiple displays, display assemblies may alternately present images and video separately to each eye stereoscopically in order to create a three dimensional effect. Such stereoscopic display assemblies, nonetheless, can require electronic shuttering and/or the use of special glasses to be worn by the viewer to ensure that the viewer's eyes properly receive the stereoscopic images and video. Because electronic shuttering and/or the use of special glasses are undesirable for many applications of display assemblies (e.g., in a vehicle), there remains a need for improved display assemblies capable of showing perceived depth.

Disclosed herein is a display assembly for showing perceived depth. The display assembly disclosed herein can include a display panel and a lens having a varying lens thickness and/or an optically clear adhesive having a varying adhesive thickness. As a result, the perception of depth can be created by the display assembly in a way that provides a visually seamless appearance across multiple planes in three dimensional space. The display assembly disclosed herein may also include physical objects (e.g., gauges in an instrument cluster) disposed between the display panel and the lens. The display assembly as disclosed is capable of creating the appearance to a viewer that the physical objects are embedded in the viewable display.

Referring to the Figures, wherein like numerals indicate corresponding parts throughout the several views, a display assembly 20 is provided. The display assembly 20 shown in FIGS. 1 and 2 includes a display panel 22 for displaying images and video. A lens 24 having a varying lens thickness extends parallel to and in a spaced relationship with the display panel 22 to define a distal viewing area 26. An optically clear adhesive 28 that is a liquid optically clear adhesive is partially disposed between the display panel 22 and the lens 24 to define plurality of proximal viewing areas (i.e., some areas, such as the distal viewing area does not include any optically clear adhesive 28). Specifically, the proximal viewing areas include a first proximal viewing area 30 and a second proximal viewing area 32. It should be appreciated that other types of optically clear adhesives 28 may be used instead.

Figure 2:
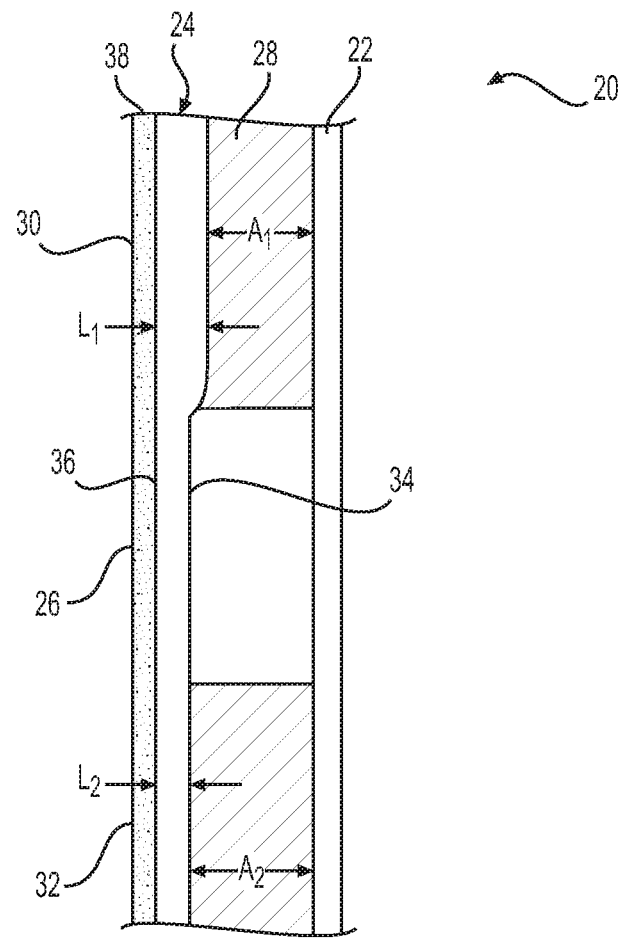
FIG. 2 shows a cross section of the display assembly of FIG. 1 taken across line 2-2.

As best shown in FIG. 2, the lens 24 defines an inner lens surface 34 facing the optically clear adhesive 28 and an outer lens surface 36 opposite the inner lens surface 34. Additionally, the lens 24 has a first portion having a first lens thickness $L_1$ and the optically clear adhesive 28 bonds to the inner lens surface 34 and to the display panel 22 with a first adhesive thickness $A_1$ in the first proximal viewing area 30. As a result, the presentation of the images and video displayed on the display panel 22 in the first proximal viewing area 30 relative to the images and video displayed on the display panel 22 in the distal viewing area 26 is altered. The lens 24 also has a second portion having a second lens thickness $L_2$ less than the first lens thickness $L_1$ in the second proximal viewing area 32. The optically clear adhesive 28 bonds to the inner lens surface 34 and to the display with a second adhesive thickness $A_2$ greater than the first adhesive thickness $A_1$ in the second proximal viewing area 32. Consequently, the images and video displayed on the display panel 22 in the second proximal viewing area 32 relative to the images and video displayed on the display panel 22 in the distal viewing area 26 and relative to the images and video displayed on the display panel 22 in the first proximal viewing area 30 are altered and a three dimensional appearance of the images and video is created. More specifically, in areas where the optically clear adhesive 28 is in full contact between the display panel 22 and the lens 24 (e.g. the proximal viewing areas 30, 32), the image and video displayed on the display panel 22 will appear to be on the lens 24 itself. In areas where the optically clear adhesive 28 is not present (e.g. the distal viewing area 26), the image will appear to be further back toward the display panel 22. It should be understood that the display assembly 20 may include any number of proximal viewing areas 30, 32 or distal viewing areas 26 and various lens and adhesive thicknesses may be utilized to achieve the desired three dimensional effect.

A touch layer 38 extends parallel to and is attached to the outer lens surface 36 for providing a touch interface. The touch layer 38 is preferably transparent, so as to not obstruct the images and video displayed, the touch layer 38 can be constructed in any way and may actually comprise more than one layer. For example, for a resistive type touch layer, two thin electrically-resistive layers could be separated by another thin layer. Alternatively, the touch layer 38 may operate using technology such as, but not limited to surface capacitance, or mutual capacitance. In another example, the display assembly 20 may not include the touch layer 38.

If, for example, the display assembly 20 is used for an infotainment type display in a vehicle, the display panel 22 could display buttons and other controls (FIG. 1). In the areas where the optically clear adhesive 28 is present (e.g. first proximal viewing area 30 and second proximal viewing area 32), the buttons or controls would appear to on the lens 24. The rest of the content (e.g. displayed in the distal viewing area 26) would appear to be behind the lens 24. This configuration could be reversed, so that the controls or buttons appear behind the lens 24 and the rest of the content appears on the lens 24.

Figure 3:
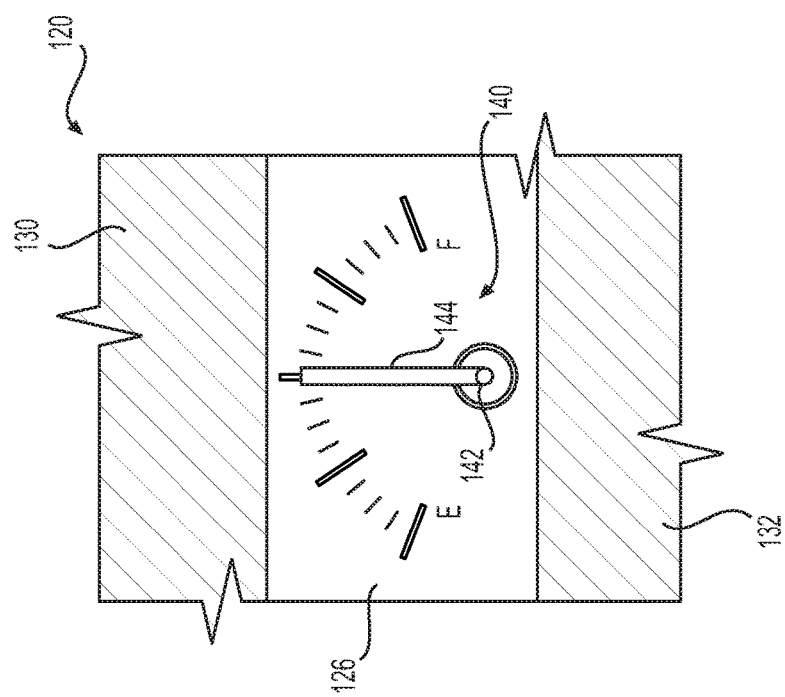
FIG. 3 illustrates another example of a display assembly for showing perceived depth.
Figure 3:
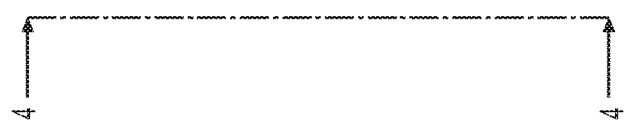
Figure 4A:
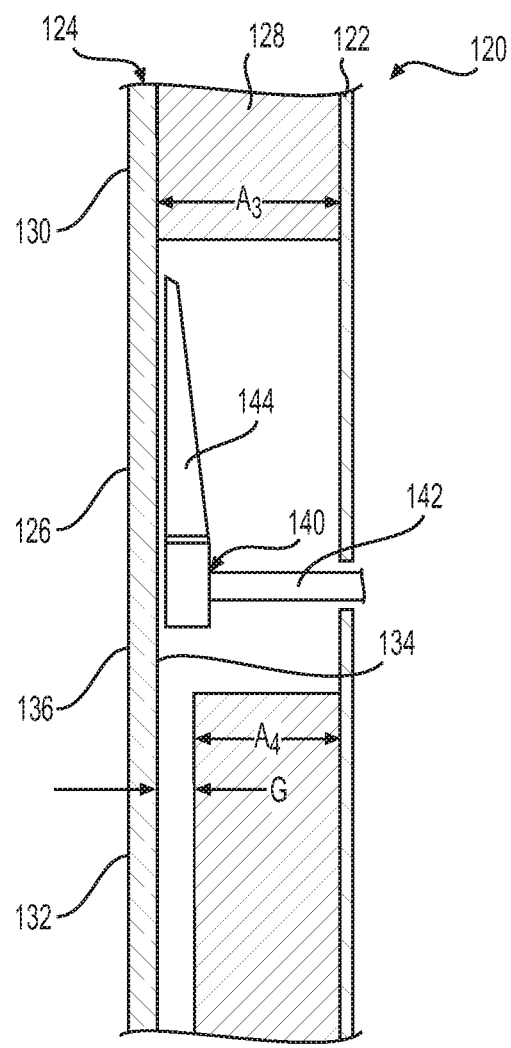
FIG. 4A illustrates a cross-sectional view of the display assembly of FIG. 3 taken across line 3-3.
Figure 4B:
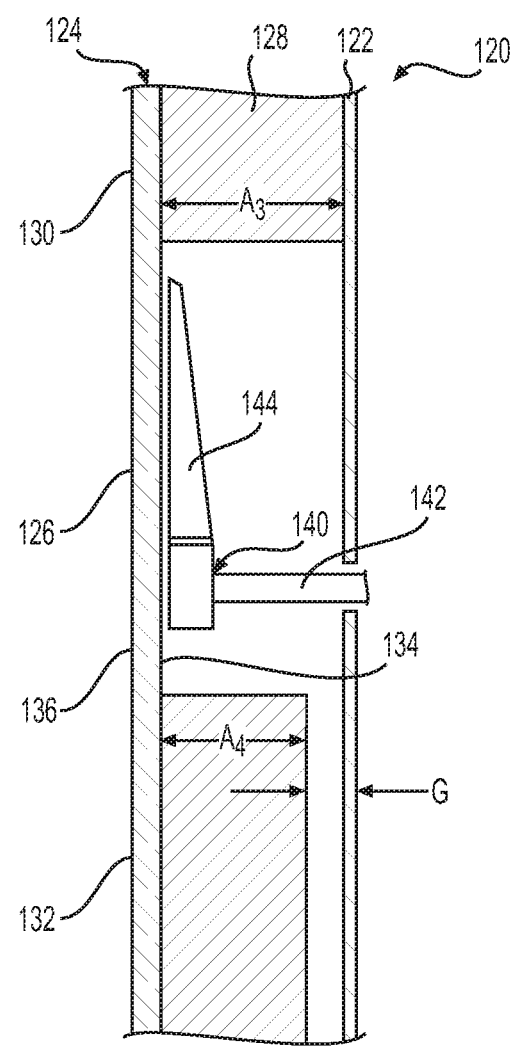
FIG. 4B illustrates an alternative cross-sectional view of the display assembly of FIG. 3 taken across line 3-3.

Another similar display assembly 120 is shown in FIGS. 3, and 4A-B. As with the display assembly 20 discussed above, the display assembly 120 includes a display panel 122 for displaying images and video. A lens 124 has a constant lens thickness and extends parallel to and in a spaced relationship with the display panel 122 to define a distal viewing area 126. A physical object 140 is disposed between the display and the lens 124 in the distal viewing area 126. The physical object 140 can be a gauge having a rotatable shaft 142 and a pointer 144 extending transversely from the shaft 142 to move in response to the shaft 142 rotating. However, it should be appreciated that other physical objects 140 may be utilized instead. An optically clear adhesive 128 that is a liquid optically clear adhesive is partially disposed between the display panel 122 and the lens 124 to define a plurality of proximal viewing areas. Particularly, the proximal viewing areas include a first proximal viewing area 130 and a second proximal viewing area 132. It should be understood that other types of optically clear adhesives 28 may be used alternatively and any number of physical objects 140, distal viewing areas 126 or proximal viewing areas 130, 132 may be utilized.

As best shown in FIG. 4A, the lens 124 defines an inner lens surface 134 facing the optically clear adhesive 128 and an outer lens surface 136 opposite the inner lens surface 134. The optically clear adhesive 128 bonds to the inner lens surface 134 and to the display panel 122 with a third adhesive thickness $A_3$ in the first proximal viewing area 130. As with the display assembly 20 in FIGS. 1 and 2, the result is that the presentation of the images and video displayed on the display panel 122 in the first proximal viewing area 130 relative to the physical object 140 and the images and video displayed on the display panel 122 in the distal viewing area 126 is altered. The optically clear adhesive 128 also bonds to the display panel 122 with a fourth adhesive thickness $A_4$ less than the third adhesive thickness $A_3$ to define an air gap G in the second proximal viewing area 132. As best shown in FIG. 4B, instead of the optically clear adhesive 128 bonding to the display panel 122 in the second proximal viewing area 132, the optically clear adhesive 128 could bond to the lens 124 with a fourth adhesive thickness $A_4$ less than the third adhesive thickness $A_3$ to define an air gap G in the second proximal viewing area 132.

In either instance, the presentation of the images and video displayed on the display panel 122 in the second proximal viewing area 132 relative to the images and video displayed on the display panel 122 in the distal viewing area 126 and relative to the physical object 140 and the images and video displayed on the display panel 122 in the first proximal viewing area 130 is altered. Thus, a three dimensional appearance of the images and video and the physical object 140 is created. Specifically, the optically clear adhesive 128 can make it appear that the physical object 140 is embedded in the display because the image and video from the display panel 122 will appear to be on the lens 124. The physical object 140 will then look like it is on a plane behind the plane of the lens 124. Because the refractive index of air in the air gap G is different than that of the optically clear adhesive 128, images and video displayed on the display panel 122 in the second proximal viewing area 132 appear differently than images and video displayed in the first proximal viewing area 130. As a result, the air gap G can also contribute to the desired three dimensional effect.

The lens 124 of the display assembly 120 shown in FIGS. 3 and 4A-B could also have a varying lens thickness similar to that described above as shown in FIGS. 1 and 2 to achieve the desired three dimensional effect. Likewise, the display assembly 120 can also include any number of proximal viewing areas 130, 132 or distal viewing areas 126. Additionally, the display assembly 120 shown in FIGS. 3, and 4A-B could also include a touch layer extending parallel to and attached to the outer lens surface 136 for providing touch input to the display assembly 120 (similar to touch layer 38 of the display assembly 20 discussed above). However, the display assembly 120 as shown does not include a touch layer, and the display assembly 120 can operate without a touch layer.

Figure 5:
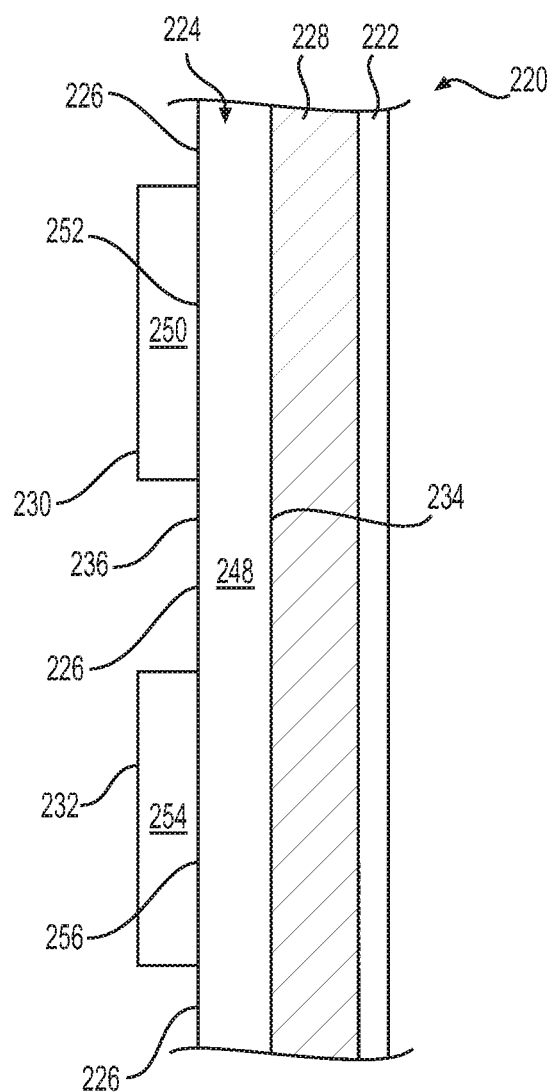
FIG. 5 illustrates a cross-sectional view of an example of a display assembly for showing perceived depth.

Another display assembly 220 is shown in FIG. 5 and includes a display panel 222 for displaying images and video. A lens 224 having a varying lens thickness extends parallel to and in a spaced relationship with the display panel 222 to define a distal viewing area 226. An optically clear adhesive 228 that is a liquid optically clear adhesive is partially disposed between the display panel 222 and the lens 224 to define a plurality of proximal viewing areas. Specifically, the proximal viewing areas include a first proximal viewing area 230 and a second proximal viewing area 232.

The lens 224 includes a primary lens 248 defining an inner lens surface 234 facing the optically clear adhesive 228 and an outer lens surface 236 opposite the inner lens surface 234 and a secondary lens 250 bonded to the inner lens surface 234 or the outer lens surface 236 with a regular bond 252 in the first proximal viewing area 230. A tertiary lens 254 is bonded to the inner lens surface 234 or the outer lens surface 236 with a liquid optically clear adhesive bond 256 in the second proximal viewing area 232. The secondary lens 250 and tertiary lens 254 may, for example, have different refractive indices and any number of secondary lenses 250 and tertiary lenses 254 may be used. Additionally, the refractive index of the liquid optically clear adhesive bond 256 can be different than that of the regular bond 252. Consequently, the refractive index differences of the bonds 252, 256 along with any differences in the secondary lens 250 and tertiary lens 254 combined with the primary lens 248 can help create the illusion of depth. It should be appreciated that display assembly 220 could also include a touch layer. The optically clear adhesive 228 and/or the liquid optically clear adhesive bond 256 can also have a varying adhesive thickness. However, it should also be understood that the lens 224 with the secondary lens 250 and/or tertiary lens 254 may be used with the display panel 222 without the optically clear adhesive 228 disposed between the display panel 222 and lens 224.

Figure 6:
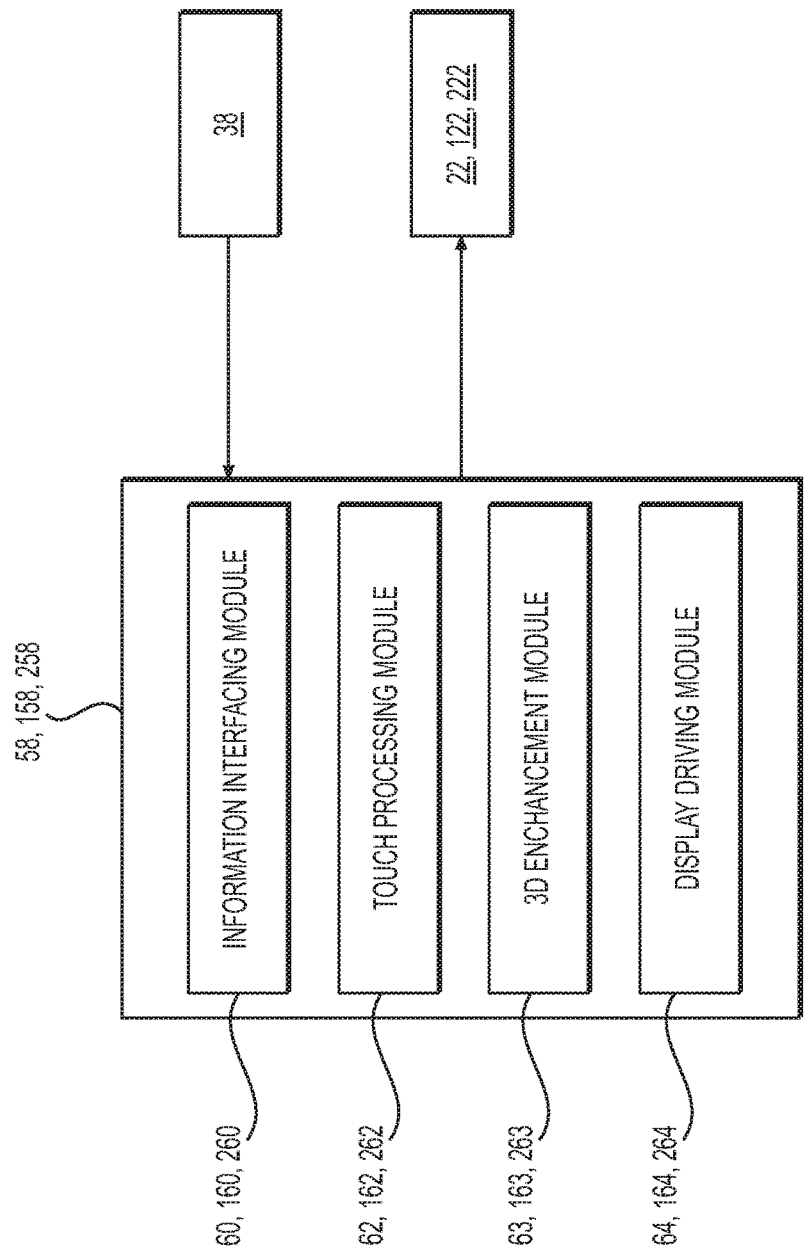
FIG. 6 illustrates an example controller of a display assembly for showing perceived depth.

The display assemblies 20, 120, 220 as described above can also include a controller 58, 158, 258 (FIG. 6) that is configured to tailor the images and video presented in the distal viewing area 26, 126, 226 relative to the images and video in the proximal viewing areas 30, 32, 130, 132, 230, 232 to further enhance the three dimensional appearance of the images and video. The controller 58, 158, 258 may be implemented as part of the display assembly 20, 120, 220 or could be implemented as a separate control unit, for example. The controller 58, 158, 258 can include, for instance, an information interfacing module 60, 160, 260, a touch processing module 62, 162, 262, a three dimensional (3D) enhancement module 63, 163, 263, and a display driving module 64, 164, 264. As used herein, the term "module" refers to computer program logic used to provide the specified functionality. Thus, a module can be implemented in hardware, firmware, and/or software.

The information interfacing module 60, 160, 260 can interface with a plurality of vehicle systems of a motor vehicle (e.g., the audio system, engine controller, etc.). The information sourced from the information interfacing module 60, 160, 260 may be provided via digital or analog signals communicated with the vehicle systems. The frequency of how often the systems are monitored may be determined by an implementation of the controller 58, 158, 258.

The touch processing module 62, 162, 262 communicates with the touch layer 38 to process touch input detected by the touch layer 38, if present. As discussed above, the touch layer 38 can provide a touch interface. More specifically, the touch layer 38 outputs a touch signal which can be received by the controller 58, 158, 258. So, once the controller 58, 158, 258 receives the touch signal, it can manipulated and evaluated using the touch processing module 62, 162, 262 to carry out an algorithm to determine the appropriate actions to take.

The 3D enhancement module 63, 163, 263 can process the images and videos to be displayed by the display panel 22, 122, 222. Depending on the desired three dimensional effects, the 3D enhancement module 63, 163, 263 can alter the images and videos that should be displayed by the display panel 22, 122, 222 in order to further enhance the three dimensional effect already created by the lens 24, 124, 224 and optically clear adhesive 28, 128, 228 of the display assembly 20, 120, 220.

The display driving module 64, 164, 264 serves to drive the display panel 22, 122, 222 of the display assembly 20, 120, 220 with appropriate signals based on information from the vehicle systems and may also be based on input from the touch layer 38 processing module (if a touch layer 38 is utilized) and may be enhanced by the 3D enhancement module 63, 163, 263. The display driving module 64, 164, 264 may be any sort of control circuitry employed to selectively alter the display panel 22, 122, 222 of the display assembly 20, 120, 220. The display driving module 64, 164, 264 could also simply instruct other vehicle systems when the display panel 22, 122, 222 of the display assembly 20, 120, 220 should be updated.

In operation, the distal viewing areas 26, 126, 226 and proximal viewing areas 30, 32, 130, 132, 230, 232 are stored in the controller 58, 158, 258. In other words, these specific portions of the images and videos of the display panel 22, 122, 222 that correspond to the distal viewing areas 26, 126, 226 and proximal viewing areas 30, 32, 130, 132, 230, 232 are defined ahead of time and known to the controller. The images and videos to be displayed on the display panel 22, 122, 222 are first sent to the 3D enhancement module 63, 163, 263 which processes the images and video and re-renders the images and video to produce 3D images and video. The re-rendered images and video are then sent to the display driving module 64, 164, 264 which causes the display panel 22, 122, 222 to display the 3D images and videos.

Obviously, many modifications and variations of the claimed invention are possible in light of the above teachings and may be practiced otherwise than as specifically described while within the scope of the appended claims. These antecedent recitations should be interpreted to cover any combination in which the inventive novelty exercises its utility.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

We claim:

1. A display assembly for showing perceived physical depth comprising:
    a display panel for displaying images and video;
    a lens extending parallel to and in a spaced relationship with the display panel to define a distal viewing area;

an optically clear adhesive partially disposed between the display panel and the lens to define a plurality of proximal viewing areas; and the lens having a varying lens thickness, wherein the optically clear adhesive has a varying adhesive thickness to alter the presentation of the images and video displayed on the display panel in the proximal viewing areas relative to the presentation of the images and video displayed on the display panel in the distal viewing area to create a three dimensional appearance of the images and video.

2. A display assembly as set forth in claim 1 wherein:

the lens defines an inner lens surface facing the optically clear adhesive and an outer lens surface opposite the inner lens surface; and the display assembly further including a touch layer extending parallel to and coupled to the outer lens surface to provide a touch interface.

3. A display assembly as set forth in claim 1 further including a controller configured to tailor the images and video presented in the distal viewing area relative to the images and video in the proximal viewing areas to enhance the three dimensional appearance of the images and video.

4. A display assembly as set forth in claim 1 wherein the optically clear adhesive is a liquid optically clear adhesive.

5. A display assembly as set forth in claim 1 wherein:

the lens includes a primary lens defining an inner lens surface facing the optically clear adhesive and an outer lens surface opposite the inner lens surface;

the lens includes a secondary lens bonded to one of the inner lens surface and the outer lens surface with a regular bond; and the lens includes a tertiary lens bonded to one of the inner lens surface and the outer lens surface with a liquid optically clear adhesive bond.

6. A display assembly as set forth in claim 1 wherein: the lens defines an inner lens surface facing the optically clear adhesive and an outer lens surface opposite the inner lens surface; the proximal viewing areas include a first proximal viewing area and a second proximal viewing area; the lens has a first portion having a first lens thickness and in which the optically clear adhesive bonds to the inner lens surface and to the display panel with a first adhesive thickness in the first proximal viewing area; and the lens has a second portion having second lens thickness less than the first lens thickness and in which the optically clear adhesive bonds to the inner lens surface and to the display panel with a second adhesive thickness greater than the first adhesive thickness in the second proximal viewing area.

7. A display assembly as set forth in claim 1 wherein: the lens defines an inner lens surface facing the optically clear adhesive and an outer lens surface opposite the inner lens surface; the proximal viewing areas include a first proximal viewing area and a second proximal viewing area; the optically clear adhesive bonds to the inner lens surface and to the display panel with a third adhesive thickness in the first proximal viewing area; and the optically clear adhesive bonds to the display panel with a fourth adhesive thickness less than the third adhesive thickness to define an air gap in the second proximal viewing area.

8. A display assembly as set forth in claim 1 wherein: the lens defines an inner lens surface facing the optically clear adhesive and an outer lens surface opposite the inner lens surface; the proximal viewing areas include a first proximal viewing area and a second proximal viewing area; the optically clear adhesive bonds to the inner lens surface and to the display panel with a third adhesive thickness in the first proximal viewing area; and the optically clear adhesive bonds to the lens with a fourth adhesive thickness less than the third adhesive thickness to define an air gap in the second proximal viewing area.

9. A display assembly as set forth in claim 1 wherein: the lens defines an inner lens surface facing the optically clear adhesive and an outer lens surface opposite the inner lens surface; and the display assembly further including a touch layer extending parallel to and coupled to the outer lens surface to provide a touch interface.

10. A display assembly as set forth in claim 1 further including a controller configured to tailor the images and video presented in the distal viewing area relative to the images and video in the proximal viewing areas to enhance the three dimensional appearance of the images and video.

11. A display assembly, comprising:

a lens surface configured to display digital data;

on a surface of the lens surface, an optically clear adhesive layer, wherein the optically clear adhesive layer is selectively applied, wherein the digital data is re-rendered based on the selective application of the optically clear adhesive layer, wherein the optically clear adhesive layer has a varying adhesive thickness to alter the presentation of images and video displayed on the display assembly in a proximal viewing areas relative to presentation of the images and video displayed on the display assembly in a distal viewing area to create a three dimensional appearance of the images and video.

\* \* \* \* \*